US012578022B2

(12) United States Patent
Shah

(10) Patent No.: US 12,578,022 B2
(45) Date of Patent: Mar. 17, 2026

(54) PNEUMATIC VALVE WITH FLEXI-SEALS

(71) Applicant: ROTEX AUTOMATION LIMITED, Vadodara (IN)

(72) Inventor: Rajesh Shah, Vadodara (IN)

(73) Assignee: ROTEX AUTOMATION LIMITED, Vadodara (IN)

( * ) Notice: Subject to any disclaimer, the term of this patent is extended or adjusted under 35 U.S.C. 154(b) by 0 days.

(21) Appl. No.: 18/034,850

(22) PCT Filed: Oct. 30, 2021

(86) PCT No.: PCT/IB2021/060072
§ 371 (c)(1),
(2) Date: May 1, 2023

(87) PCT Pub. No.: WO2022/091046
PCT Pub. Date: May 2, 2022

(65) Prior Publication Data
US 2023/0407974 A1    Dec. 21, 2023

(30) Foreign Application Priority Data

Oct. 30, 2020    (IN) .............................. 202021047485

(51) Int. Cl.
*F16K 3/02* (2006.01)
*F16K 11/07* (2006.01)
*F16K 27/04* (2006.01)

(52) U.S. Cl.
CPC .............. *F16K 3/0227* (2013.01); *F16K 3/02* (2013.01); *F16K 11/0712* (2013.01); *F16K 27/04* (2013.01)

(58) Field of Classification Search
CPC .... F16K 3/0227; F16K 27/04; F16K 11/0712; F16K 3/02
See application file for complete search history.

(56) References Cited

U.S. PATENT DOCUMENTS 2,650,869 A  *  9/1953  Marien ...................... F16J 9/04
                                                       277/447
2,719,767 A  *  10/1955  Ernest ...................... F16J 9/063
                                                       277/447
(Continued)

FOREIGN PATENT DOCUMENTS

EP          0135042 B1    9/1987
JP          2006-258183 A    9/2006

OTHER PUBLICATIONS

International Preliminary Report on Patentability received for PCT Patent Application No. PCT/IB2021/060072, mailed on Jun. 3, 2022, 5 pages.

(Continued)

*Primary Examiner* — Craig M Schneider
*Assistant Examiner* — Christopher D Ballman
(74) *Attorney, Agent, or Firm* — Workman Nydegger

(57) ABSTRACT

A pneumatic valve 300 includes flexi-seals 302 that are annular shaped with non-circular cross-section and are fitted in peripheral groves in plunger 304 of the valve such that a portion of the flexi-seal 302 projects out of the outer circumference of the plunger 304. As the plunger 304 is moved towards a valve seat 314, the projecting portion of the flexi-seal 302 rests against a flat surface of the valve seat 314 to close the passage through the valve seat. The flexi-seal design prevents plurality of bends in the flow passages of the pneumatic valve 300, results in reduced friction during the linear movement of the plunger 304, eliminates movement of seals over edges of cross holes in the plunger bore 306. Besides the flexi-seals are flexible, do not permanently deform, and do not require lubricating media.

9 Claims, 6 Drawing Sheets

(56)                References Cited

U.S. PATENT DOCUMENTS

| | | | | |
|---|---|---|---|---|
| 4,074,700 A * | 2/1978 | Engle | F16K 31/0627 | 251/282 |
| 4,494,572 A * | 1/1985 | Loveless | F16K 31/0634 | 137/625.5 |
| 4,809,749 A * | 3/1989 | Ichihashi | F16K 31/0613 | 137/625.68 |
| 4,823,840 A * | 4/1989 | Kosugi | F16K 11/044 | 137/625.5 |
| 4,842,020 A * | 6/1989 | Tinholt | F15B 13/044 | 137/625.26 |
| 4,971,115 A * | 11/1990 | Tinholt | F15B 13/0405 | 137/625.5 |
| 5,099,564 A * | 3/1992 | Lecointre | F16K 11/0712 | 29/402.06 |
| 5,119,858 A * | 6/1992 | Dartnall | F16K 15/06 | 137/516.25 |
| 5,535,783 A * | 7/1996 | Asou | F16K 31/0693 | 137/625.65 |
| 5,971,022 A * | 10/1999 | Hayashi | F16K 11/0712 | 137/625.69 |
| 5,988,591 A * | 11/1999 | Akimoto | F16K 11/0712 | 251/324 |
| 6,089,575 A * | 7/2000 | Ottersbach | F16K 27/041 | 277/927 |
| 6,116,276 A * | 9/2000 | Grill | F16K 31/0627 | 137/596.17 |
| 6,488,050 B1 * | 12/2002 | Jabcon | F16K 11/044 | 137/625.65 |
| 6,860,294 B2 * | 3/2005 | Hirota | F16K 31/423 | 137/596.17 |
| 6,913,037 B2 * | 7/2005 | Miyazoe | F15B 13/0817 | 137/557 |
| 7,448,411 B2 * | 11/2008 | Friedman | F16K 31/025 | 355/1 |
| 7,980,269 B2 * | 7/2011 | Fry | B61D 7/28 | 137/625.69 |
| 8,141,848 B2 * | 3/2012 | Elston | F16K 11/0712 | 277/575 |
| 8,151,824 B2 * | 4/2012 | Williams | F16K 31/0627 | 137/625.69 |
| 8,453,678 B2 * | 6/2013 | Neff | F16K 11/0712 | 251/360 |
| 8,523,144 B2 * | 9/2013 | Pechtold | F16K 1/36 | 251/332 |
| 8,783,653 B2 * | 7/2014 | Jamison | F16K 31/0627 | 137/625.2 |
| 9,010,373 B2 * | 4/2015 | Neff | F15B 13/044 | 251/282 |
| 9,074,699 B2 * | 7/2015 | Jamison | F16K 27/029 | |
| 9,285,051 B2 * | 3/2016 | Hirota | F16K 11/10 | |
| 9,556,961 B2 * | 1/2017 | Shiota | F16K 3/02 | |
| 10,119,615 B2 * | 11/2018 | Hoang | F16K 3/0281 | |
| 10,167,962 B2 * | 1/2019 | Itoh | F16K 27/041 | |
| 10,174,771 B2 * | 1/2019 | Miyazoe | F16K 31/383 | |
| 10,228,072 B1 * | 3/2019 | Tinholt | F16K 31/0634 | |
| 10,788,134 B2 * | 9/2020 | Chaudhry | F16K 11/0712 | |
| 2006/0021664 A1 * | 2/2006 | Katsuta | F16K 31/0627 | 137/625.65 |
| 2020/0056704 A1 * | 2/2020 | Ichimaru | F16K 1/42 | |

OTHER PUBLICATIONS

International Search Report and Written Opinion received for PCT Patent Application No. PCT/IB2021/060072, mailed on Feb. 18, 2022, 13 pages.

* cited by examiner

302

302

302

PNEUMATIC VALVE WITH FLEXI-SEALS

TECHNICAL FIELD

The present disclosure relates to the field of pneumatic valves. In particular, the present disclosure relates to seals used in plunger/piston of a pneumatic valve. More particularly, the disclosure pertains to an improved seal for use in the pneumatic valves.

BACKGROUND

Background description includes information that may be useful in understanding the present invention. It is not an admission that any of the information provided herein is prior art or relevant to the presently claimed invention, or that any publication specifically or implicitly referenced is prior art.

Pneumatic valves, such as a 5×2 poppet valve shown in FIG. 1, use a number of seals, such as seals 102-1 and 102-2 (collectively referred to as seal(s) 102 hereinafter) shown in FIG. 1, where a cross sectional view of a poppet valve 100 having spool rigid seal design is shown. The seals 102 function to prevent flow of a fluid, such as air, from one side of a plunger 104 to other as the plunger 104 moves linearly within a plunger bore 106 to open a passage and close other. For example, as shown in FIG. 1A, when the plunger 104 is moved down passage 108-1 connecting an inlet port 110 to a first outlet port 112-1, is opened, and when the plunger 104 is moved up, passage 108-2 connecting the inlet port 110 to a second outlet port 112-2, is opened and the passage 108-1 is closed.

Another design commonly used for seals in pneumatic valves is poppet rigid seal design 200, shown in FIG. 2. As shown therein, seal 202 is fixed on the plunger 104 such that when the plunger 204 moves up the seal 202 rests against a face to block a passage 208, and when the plunger 204 is moves down the seal moves away from the face to allow the fluid to move from inlet port 210 to an outlet port 212 through the passage 208.

However, both these designs suffer from drawbacks, such as restricted flow, low life, leakage and high response time. Because of the design of these seals, the valves incorporating them have a number of bends in the flow passages, which restrict the flow rate and also cause foreign particles to get stuck in the passage. The foreign particles may also get stuck on valve seats causing improper closing of the valve seat resulting in leakage. The stuck foreign particles can also affect life of components. The valves employing the conventional seals also require high surface finish on the components to get proper sealing. Further, the valves employing the conventional seals require lubricating media, without which the valve is likely to get stuck. Furthermore, as the conventional seals do not have any flexibility there is a high chance of the seals getting permanently deformed affecting performance.

Another disadvantage of the valves employing conventional seals is that the design requires the seals to move over the edges of cross holes resulting in high wear of the seals. Further disadvantage is in respect of response time, i.e. position change over time, of the valves since on account of high friction more force is required to move the plunger to overcome the friction, which takes time.

Therefore, there is a requirement of improved seals for pneumatic valves that overcomes the drawbacks of the conventional seals.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

OBJECTS OF THE INVENTION

A general object of the present disclosure is to overcome drawbacks of the conventional seals used in pneumatic valves.

An object of the present disclosure is to provide seals for pneumatic valves that does not result in plurality of bends in the flow passages of the valve.

Another object of the present disclosure is to provide seals for pneumatic valves that result in reduced friction during the linear movement of the plunger.

Another object of the present disclosure is to provide seals for pneumatic valves that do not have to move over edges of cross holes in the plunger bore of the valve.

Another object of the present disclosure is to provide seals for pneumatic valves that are flexible and do not permanently deform.

Another object of the present disclosure is to provide seals for pneumatic valves that do not require lubricating media.

SUMMARY

Aspects of the present disclosure relate to a pneumatic valve. In particular, the present disclosure relates to an improved seal used in plunger/piston of a pneumatic valve. The disclosed seal prevents plurality of bends in the flow passages of the valve, results in reduced friction during the linear movement of the plunger, do not move over edges of cross holes in the plunger bore 306 of the valve, are flexible and do not permanently deform, and do not require lubricating media, thereby overcoming the drawbacks of the conventional seals used in such valves.

In an aspect, the disclosed valve assembly includes a plunger configured for linear movement in a plunger bore within a valve housing and having one or more circumferential groves; and one or more flexi-seals, configured in corresponding circumferential groves of the plunger. In an aspect, the flexi-seals are configured with the groves such that a portion of the flexi-seals protrudes out of an outer circumferential surface of the plunger, and the protruding portion of the one or more flexi-seals is not in contact with an inner surface of the plunger bore.

The linear movement of the plunger results in the protruding portion of the flexi-seals to rest against valve seats configured on the plunger bore to close one or more fluidic passages to control flow of a fluid through the valve assembly.

The one or more flexi-seals have a non-circular cross section. In implementation, the one or more flexi-seals may have a rectangular cross section with a portion of a width of the flexi-seal being configured to project out of the corresponding circumferential grove and a thickness of the flexi-seal being configured to engage with the corresponding circumferential grove. The width of the one or more flexi-seals can be more than the thickness of the flexi-seal.

In an embodiment, the valve seat can be of a shape of a step collar in the plunger bore.

Depending on application and requirement, the flexi-seals can be made of a material selected from Silicon, PU, NBR, EPDM and Viton.

In implementation, the valve housing can include two or more cross holes that open in the plunger bore and the plunger bore can include one or more valve seats. The two or more cross holes can be configured such that each of the two or more cross holes is fluidically coupled to the other cross holes through the plunger bore with one of the one of the one or more valve seats located in the connecting fluidic passage.

In an exemplary implementation, the valve assembly can be a poppet valve having three cross holes that open in the plunger bore and two valve seats on the plunger bore. The three cross holes can include an inlet port, a first outlet port and a second outlet port and the three cross holes and the valve seats can be configured such that the inlet port is fluidically coupled to the two outlet ports through the plunger bore with one of the two valve seat located in each of the connecting fluidic passages between the inlet port and the two outlet ports. Further, the two valve seats may be configured on the plunger bore such that the linear movement of the plunger in a first direction results in closing the valve seat between the inlet port and the first outlet port and opening of the fluidic passage between the inlet port and the second outlet port, and wherein the linear movement of the plunger in a second direction, which is opposite the first direction, results in closing the valve seat between the inlet port and the second outlet port and opening of the fluidic passage between the inlet port and the first outlet port.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Various terms are used herein. To the extent a term used in a claim is not defined, it should be given the broadest definition persons in the pertinent art have given that term as reflected in printed publications and issued patents at the time of filing.

Embodiments explained herein relate to a pneumatic valve employing the disclosed flexi-seals. In an aspect, the disclosed flexi-seals overcome the drawbacks of the conventional seals used in such valves. In particular, the disclosed flexi-seals prevent plurality of bends in the flow passages of the valve, result in reduced friction during the linear movement of the plunger, do not move over edges of cross holes in the plunger bore of the valve, are flexible and do not permanently deform, and do not require lubricating media.

In an aspect, the proposed flexi-seals are having rectangular or square or of any other non-circular shaped cross section, and are fitted on the plunger in a recess/grove on the outer circumference of the plunger such that a part of the seal projects out of the outer circumference of the plunger. As the plunger is moved to towards a valve seat, the projecting portion of the flexi-seal rests against a flat surface of the valve seat to close the passage through the valve seat. On the other hand, when the plunger is moved to away from the valve seat, the projecting portion of the flexi-seal too moves away from the flat surface of the valve seat to allow the fluid to pass through the valve seat.

Figure 1A:
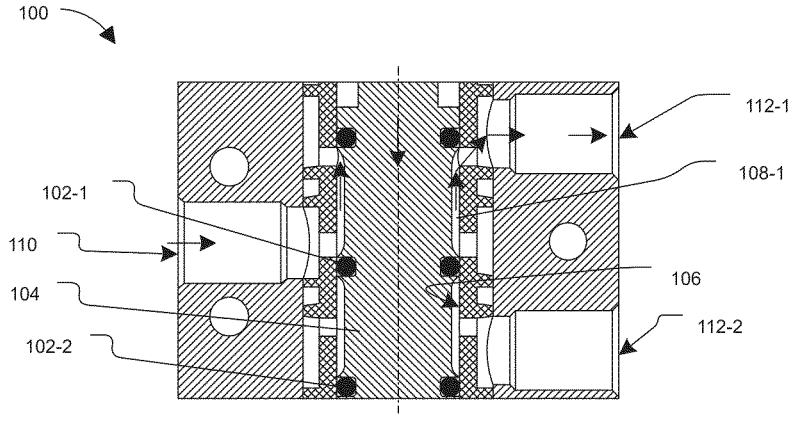
FIGS. 1A and 1B illustrate cross sectional views of a conventional pneumatic valve having spool rigid seal design, respectively showing operation of the valve to connect an input port to a first outlet port and second outlet port.
Figure 1B:
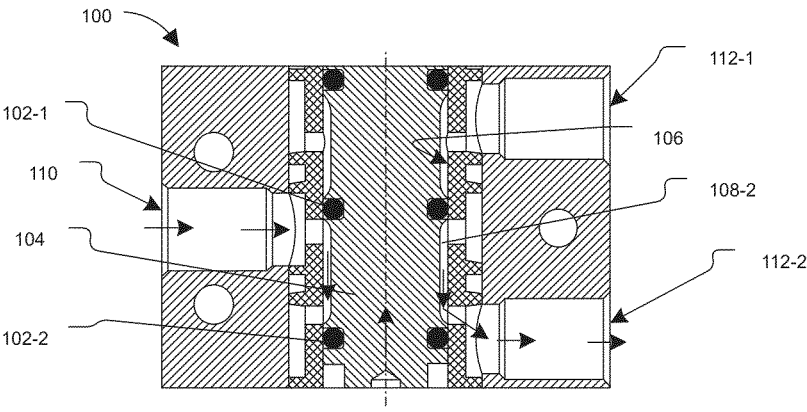
Figure 2:
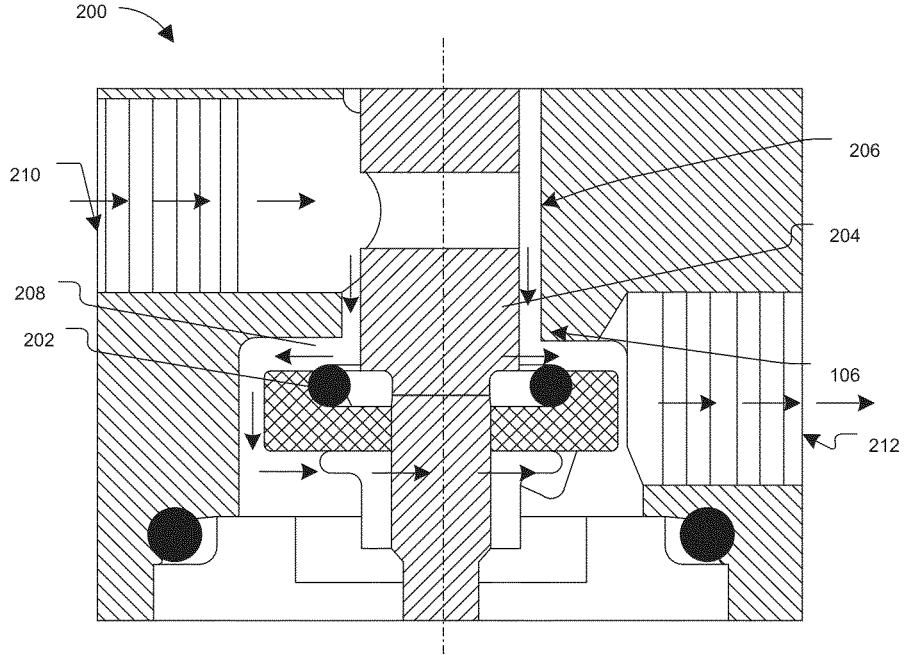
FIG. 2 illustrates a cross sectional view of a conventional pneumatic valve having poppet rigid seal design.
Figure 3:
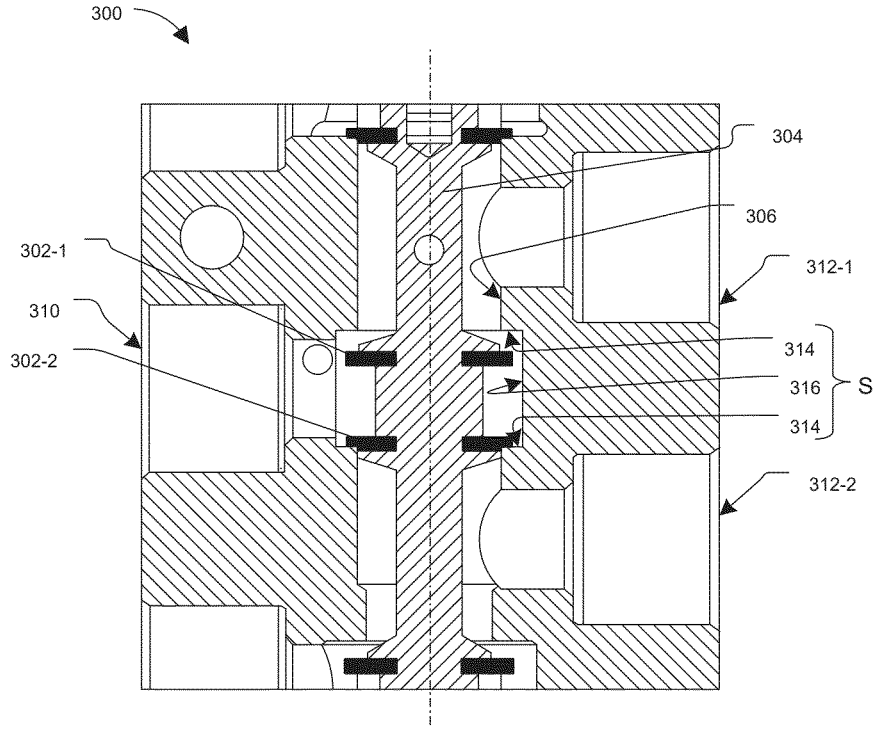
FIG. 3 illustrates an exemplary cross-sectional view of a pneumatic valve configured with the proposed flexi-seals, in accordance with embodiments of the present disclosure.

Referring now to FIG. 3, where a poppet valve employing the flexi-seals is disclosed, the poppet valve 300 (also referred to as pneumatic valve 300 or simply as valve 300 and the two terms used interchangeably hereinafter) includes a plunger 304 configured for linear movement in a plunger bore 306, and one or more flexi-seals, such as flexi-seals 302-1 and 302-2 (hereinafter collectively referred to as flexi-seal 302). Each of the flexi-seal is configured in a corresponding circumferential grove provided in the plunger. As shown in FIG. 3, the flexi-seals 302 and the corresponding groves are configured such that when the flexi-seals 302 are fitted in the groves, a portion of the flexi-seals 302 protrudes out of an outer diameter of the plunger 304. The plunger bore 304 includes a narrow diameter portion and an enlarged diameter portion S, that has a bigger diameter than that of the narrow diameter portion. The enlarged diameter portion S includes one or more valve seats 314 at a transition between the narrow diameter portion and the enlarged diameter portion S. The enlarged diameter portion S further comprises an enlarged cylindrical portion 316. The portion of the flexi-seals 302 that protrudes out of an outer diameter of the plunger 304 is not in contact with enlarged cylindrical portion 316 of the enlarged diameter portion S of the plunger bore 306.

Figure 4A:
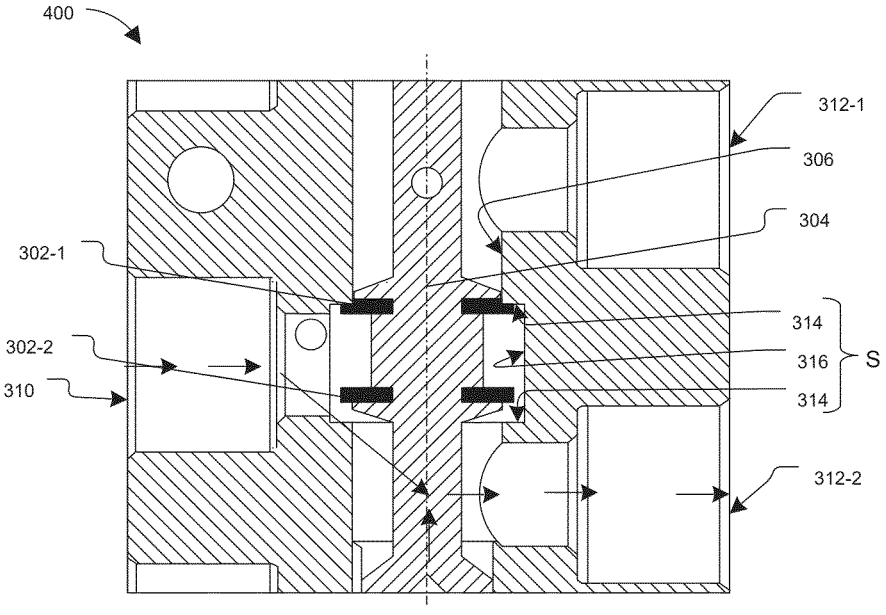
FIGS. 4A and 4B illustrate exemplary cross-sectional views of a pneumatic valve configured with the proposed flexi-seals, respectively showing operation of the valve to connect an input port to a first outlet port and a second outlet port, in accordance with embodiments of the present disclosure.
Figure 4B:
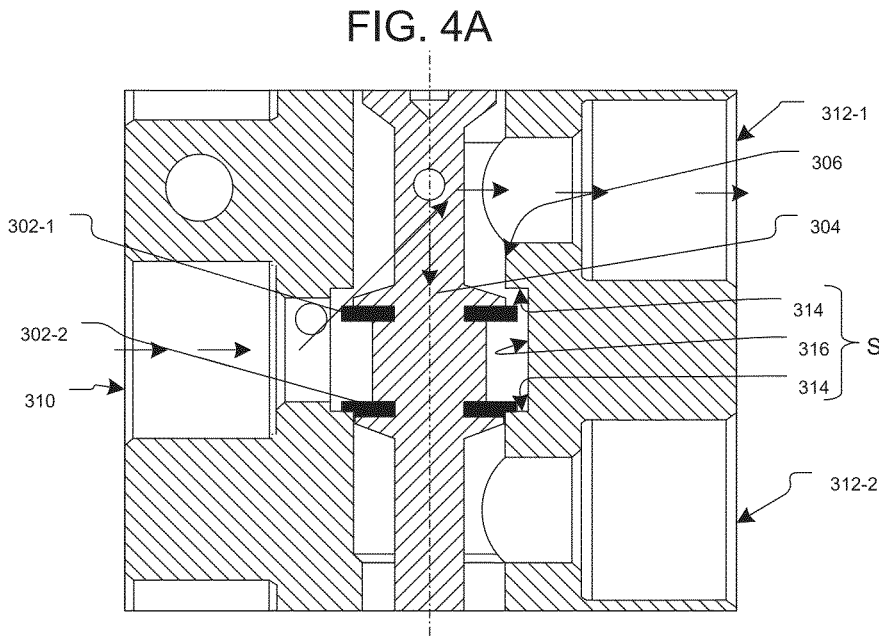

FIGS. 4A and 4B show working of the pneumatic valve 300 of FIG. 3, wherein FIG. 4A shows a position of the valve 300 with the plunger 304 moved down, which results in opening of a passage 308-1 connecting an inlet port 310 to a first outlet port 312-1, and FIG. 4B shows another position of the valve 300 with the plunger 304 moved up, which results in opening of a passage 308 connecting the inlet port 310 to a second outlet port 312-2. As shown in FIGS. 4A and 4B, when the plunger 304 is linearly moved up or moved down, the projecting portion of a corresponding flexi-seal 302 rests against a flat surface of a corresponding step collar shaped valve seat 314 to close the corresponding passage through the valve seat 314, and when the plunger 304 is moved to away from the valve seat 314, the projecting portion of the flexi-seal 302 too moves away from the flat surface of the valve seat 314 to allow the fluid to pass through the valve seat 314.

Figure 4C:
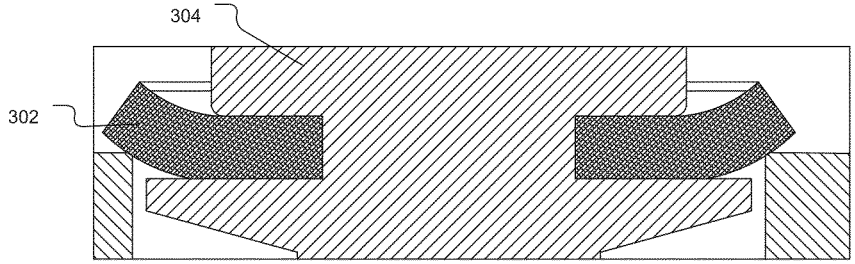
FIG. 4C illustrates an exemplary cross section showing deflection of the flexi-seal as the seal sits on a seat to close a passage, in accordance an embodiment of the present disclosure.

FIG. 4C shows deflection of the flexi-seal 302 as the flexi-seal 302 sits on a corresponding flat surface of the valve seat to close the corresponding passage. In an embodiment, the flexi-seal is made of a resilient material, such as but not limited to rubber, or other polymers, which enables deflection of the projected portion of the flexi-seal 302, when it is pressed against the valve seat. The resilient material enables the flexi-seal 302 to revert back to its original shape after the plunger 304 is moved away from the valve seat.

Figure 5A:
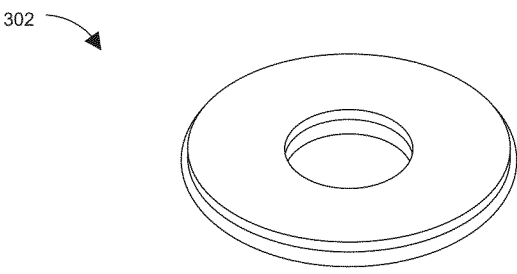
FIGS. 5A to 5C illustrate an exemplary perspective view, top view and side view respectively of the disclosed flexi-seal, in accordance with the third embodiment of the present disclosure.
Figure 5B:
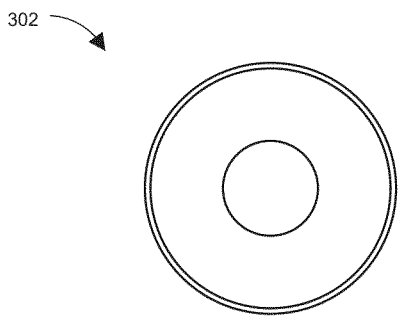
Figure 5C:
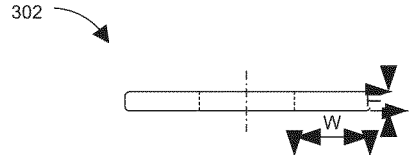

FIGS. 5A to 5C illustrate perspective view, top view and side view respectively of the disclosed flexi-seal. As shown, the flexi-seal 302 can be of annular shape having an outer diameter and an inner diameter. The inner diameter of the flexi-seal 302 can correspond to an inner diameter of the corresponding grove provided in the plunger 304, and the outer diameter of the flexi-seal 302 can be more than the outer diameter of the plunger 304 so that, when the flexi-seal 302 is fitted in the grove of the plunger 304, an outer peripheral portion of the flexi-seal 302 projects out of the outer circumferential surface/outer diameter of the plunger 304.

In an embodiment, cross section of the flexi-seal 302 can be rectangular with its width W being more than its thickness T. a higher width than the thickness can help in achieving adequate projection of the flexi-seal 302 out of the outer circumferential surface/outer diameter of the plunger 304 and yet have adequate portion engaging in the grove to prevent it from getting dislodged under pressure from the valve seat. However, a square cross section, or any other non-circular cross section, is well within the scope of the present disclosure. Specifically, based on pressure required to be handled by the valve, thickness of the flexi seal can be changed.

In an embodiment, the flexi-seals can be made of a material selected based on variations in functional requirements, such as fluid to be handled by the valve, ambient temperature, fluid temperature etc. Some of the exemplary materials can be, but not limited to, Silicon, PU, NBR, EPDM, Viton.

Prototypes of valve incorporating the disclosed concept was manufactured and they passed all the required validation tests successfully.

Thus, the present disclosure provides an alternate sealing arrangement used in valves to overcome draw backs associated with the conventional seals. The disclosed flexi-seals prevent plurality of bends in the flow passages of the valve, reduce friction during the linear movement of the plunger, eliminate damage to the seals due to movement of the seals over edges of cross holes in the plunger bore. Besides, the flexi-seals are flexible, do not permanently deform, and do not require lubricating media, thereby overcoming drawbacks of conventional seals used in such valves While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE INVENTION

The present disclosure provides a sealing system for pneumatic valves that overcomes drawbacks of the conventional seals used in pneumatic valves.

The present disclosure provides seals for pneumatic valves that does not result in plurality of bends in the flow passages of the valve.

The present disclosure provides for pneumatic valves that result in reduced friction during the linear movement of the plunger.

The present disclosure provides for pneumatic valves that do not have to move over edges of cross holes in the plunger bore of the valve.

The present disclosure provides for pneumatic valves that are flexible and do not permanently deform.

The present disclosure provides seals for pneumatic valves that do not require lubricating media.

I claim:

1. A valve assembly comprising;

a plunger bore configured within a valve housing, the plunger bore having a narrow diameter portion and an enlarged diameter portion, wherein the enlarged diameter portion has a bigger diameter than that of the narrow diameter portion, and wherein the enlarged diameter portion comprises one or more valve seats at a transition between the narrow diameter portion and the enlarged diameter portion, and the enlarged diameter portion further comprises an enlarged cylindrical portion thereof;

a plunger configured for linear movement in a the plunger bore, the plunger having one or more circumferential groves; and one or more flexi-seals, each flexi-seal configured in a corresponding circumferential grove of the one or more circumferential groves of the plunger such that a portion of the flexi-seals protrudes out of an outer circumferential surface of the plunger, and wherein a diameter the one or more flexi-seals is less than diameter of the enlarged diameter portion of the plunger bore such that the one or more flexi seals are not in contact with a the enlarged cylindrical portion of the enlarged diameter portion of the plunger bore;

wherein the one or more flexi-seals have a rectangular cross section with a portion of a width of the flexi-seal being configured to project out of the corresponding circumferential grove and a thickness of the flexi-seal being configured to engage with the corresponding circumferential grove; and wherein linear movement of the plunger results in the protruding portion of the one or more flexi-seals to rest against the one or more valve seats to close one or more fluidic passages to control flow of a fluid through the valve assembly.

2. The valve assembly as claimed in claim 1, wherein the one or more flexi-seals have a non-circular cross section.

3. The valve assembly as claimed in claim 1, wherein the width of the one or more flexi-seals is more than the thickness of the flexi-seal.

4. The valve assembly as claimed in claim 3, wherein the one or more valve seats are of a shape of a step collar in the plunger bore.

5. The valve assembly as claimed in claim 1, wherein the one or more flexi-seals are made of a material selected from a group comprising Silicon, PU, NBR, EPDM and Viton.

6. The valve assembly as claimed in claim 1, wherein the valve housing comprises two or more cross holes that open in the plunger bore.

7. The valve assembly as claimed in claim 6, wherein the two or more cross holes are configured such that each of the two or more cross holes is fluidically coupled to the other cross holes through the plunger bore with one of the one or more valve seats located in the connecting fluidic passage.

8. The valve assembly as claimed in claim 1, wherein the valve assembly is a poppet valve comprising three cross holes that open in the plunger bore and two valve seats on the plunger bore, the three cross holes being an inlet port, a first outlet port and a second outlet port and wherein the three cross holes and the valve seats are configured such that the inlet port is fluidically coupled to the two outlet ports through the plunger bore with one of the two valve seat located in each of the connecting fluidic passages between the inlet port and the two outlet ports.

9. The valve assembly as claimed in claim 8, wherein the two valve seats are configured on the plunger bore such that the linear movement of the plunger in a first direction results in closing the valve seat between the inlet port and the first outlet port and opening of the fluidic passage between the inlet port and the second outlet port, and wherein the linear movement of the plunger in a second direction, which is opposite the first direction, results in closing the valve seat between the inlet port and the second outlet port and opening of the fluidic passage between the inlet port and the first outlet port.

* * * * *